US012726259B2

(12) United States Patent
Nagalapur et al.

(10) Patent No.: US 12,726,259 B2
(45) Date of Patent: Sep. 1, 2026

(54) METHOD AND DEVICES FOR PROVIDING BACKHAUL LINKS

(71) Applicant: Telefonaktiebolaget LM Ericsson (publ), Stockholm (SE)

(72) Inventors: Keerthi Kumar Nagalapur, Gothenburg (SE); Jingya Li, Gothenburg (SE); Sam Agneessens, Torslanda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 288 days.

(21) Appl. No.: 18/689,349

(22) PCT Filed: Sep. 7, 2021

(86) PCT No.: PCT/EP2021/074600
§ 371 (c)(1),
(2) Date: Mar. 5, 2024

(87) PCT Pub. No.: WO2023/036402
PCT Pub. Date: Mar. 16, 2023

(65) Prior Publication Data
US 2025/0141533 A1 May 1, 2025

(51) Int. Cl.
*H04B 7/185* (2006.01)
*H04W 16/28* (2009.01)

(52) U.S. Cl.
CPC ........ *H04B 7/18504* (2013.01); *H04W 16/28* (2013.01)

(58) Field of Classification Search
CPC ..... H04W 16/28; H04W 72/046; H04W 4/44; H04W 84/005; H04B 7/0617; H04B 7/18504; H04B 7/06952; H04B 7/18506
See application file for complete search history.

(56) References Cited

U.S. PATENT DOCUMENTS 10,348,394 B1 * 7/2019 Bakr .................. H04L 12/4625
10,425,148 B2 * 9/2019 Jalali ................. H04B 7/18504
(Continued)

FOREIGN PATENT DOCUMENTS

EP 3120411 A1 1/2017
EP 3507999 A1 7/2019
(Continued)

OTHER PUBLICATIONS

International Search Report and Written Opinion issued in International Application No. PCT/EP2021/074600 dated Jun. 15, 2022 (22 pages).
(Continued)

*Primary Examiner* — Mong-Thuy T Tran
(74) *Attorney, Agent, or Firm* — Rothwell, Figg, Ernst & Manbeck, P.C.

(57) ABSTRACT

An aerial base station is disclosed comprising a directive backhaul antenna for obtaining a backhaul link to a ground-based donor base station. The directive backhaul antenna is arranged on a body of the aerial base station such that a direction of a main beam of the directive backhaul antenna towards the donor base station is essentially parallel to an axis of a largest dimension of the directive backhaul antenna. The directive backhaul antenna is mounted such that the axis of the largest dimension is parallel to the body of the aerial base station.

19 Claims, 5 Drawing Sheets

(56) References Cited

U.S. PATENT DOCUMENTS

| | | | | |
|---|---|---|---|---|
| 2018/0019516 | A1* | 1/2018 | Teague | H04B 7/18504 |
| 2018/0097560 | A1 | 4/2018 | Jalali | |
| 2020/0107309 | A1* | 4/2020 | Akoum | H04W 72/046 |
| 2021/0313669 | A1* | 10/2021 | Ananth | H01Q 3/247 |
| 2022/0053433 | A1* | 2/2022 | Abedini | H04L 5/0023 |
| 2022/0150719 | A1* | 5/2022 | Park | H04W 16/28 |
| 2022/0311505 | A1* | 9/2022 | Davidson | H04B 7/18504 |
| 2023/0336239 | A1* | 10/2023 | Schmidt | H04B 7/15542 |
| 2024/0040463 | A1* | 2/2024 | Haustein | H04W 36/30 |

FOREIGN PATENT DOCUMENTS

| | | | |
|---|---|---|---|
| EP | 3512116 | A1 | 7/2019 |
| WO | 2015/143042 | A1 | 3/2015 |
| WO | 2018/071453 | A1 | 4/2018 |

OTHER PUBLICATIONS

International Preliminary Report on Patentability issued in International Application No. PCT/EP2021/074600 dated Dec. 20, 2023 (19 pages).

Lee, W. et al., "End-Fire Vivaldi Antenna Array With Wide Fan-Beam for 5G Mobile Handsets", IEEE Access, vol. 8, 2020 (6 pages).

Dabiri, M. et al., "Analytical Channel Models for Millimeter Wave UAV Networks under Hovering Fluctuations" May 4, 2019 (13 pages).

Pokorny, J., "Concept design and performance evaluation of UAV-based backhaul link with antenna steering", Journal of Communications and Networks, Oct. 2018 (12 pages).

Sharma, A. et al., "Communication and Networking Technologies for UAVs: A Survey", Jul. 21, 2020 (24 pages).

Tafintsev, N. et al., "Aerial Access and Backhaul in mmWave B5G Systems: Performance Dynamics and Optimization", Nov. 13, 2019 (7 pages).

Xia, W. et al., "Multi-Array Designs for mmWave and Sub-Thz Communication to UAVs", 2020 IEEE 21st International Workshop on Signal Processing Advances in Wireless Communications (SPAWC), 2020 (5 pages).

Ge, L. et al., "Joint Beamforming and Trajectory Optimization for Intelligent Reflecting Surfaces-Assisted UAV Communications", IEEE Access, Apr. 2020 (11 pages).

* cited by examiner

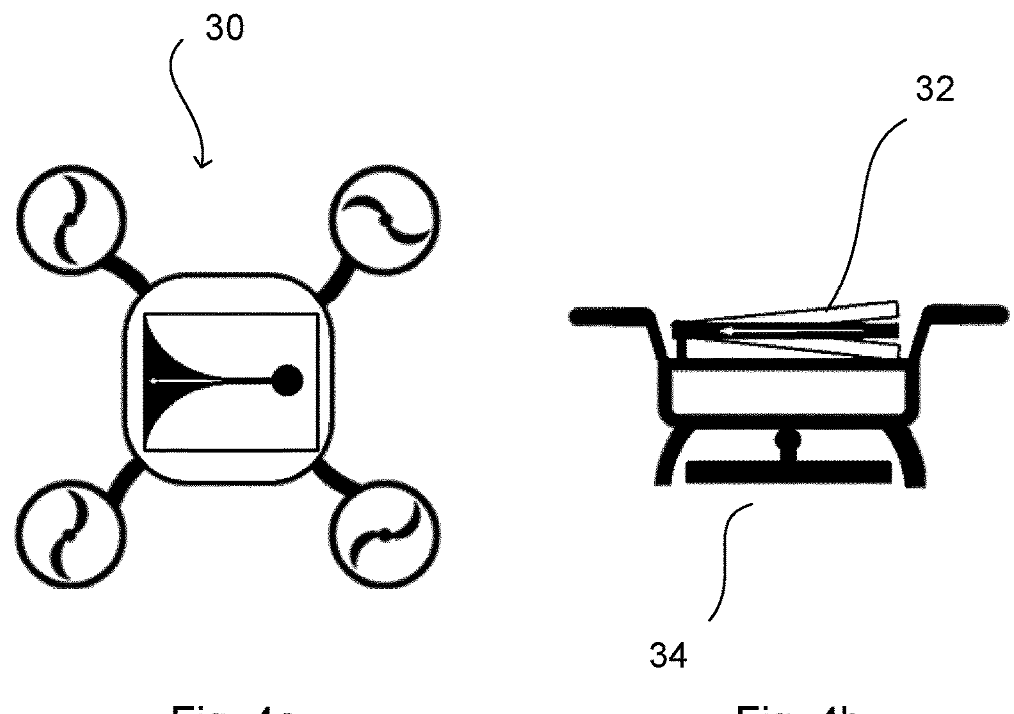
Fig. 4a
Fig. 4b
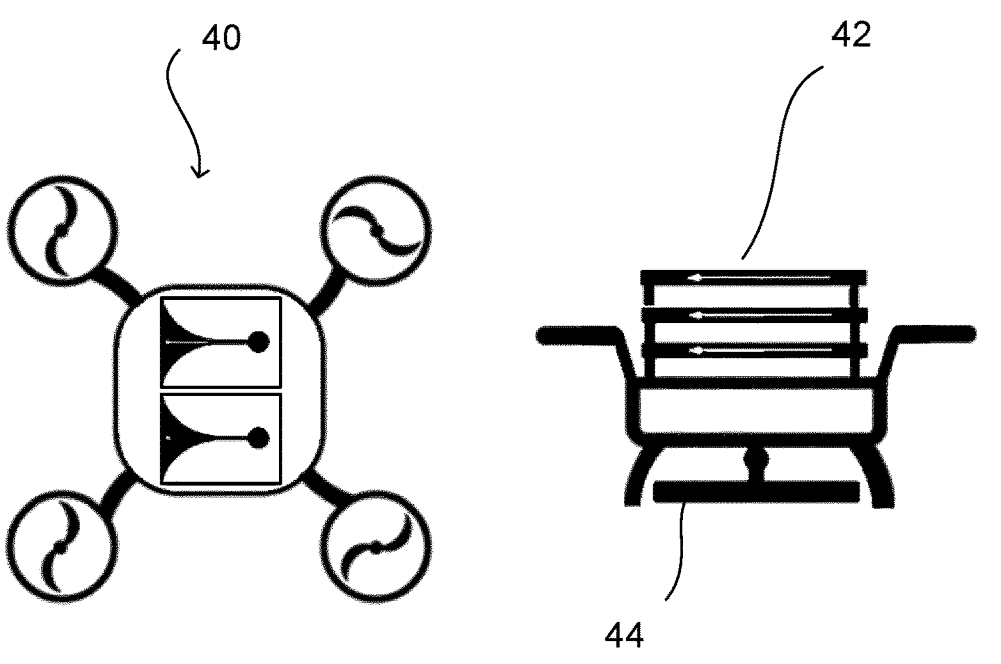
Fig. 5a
Fig. 5b

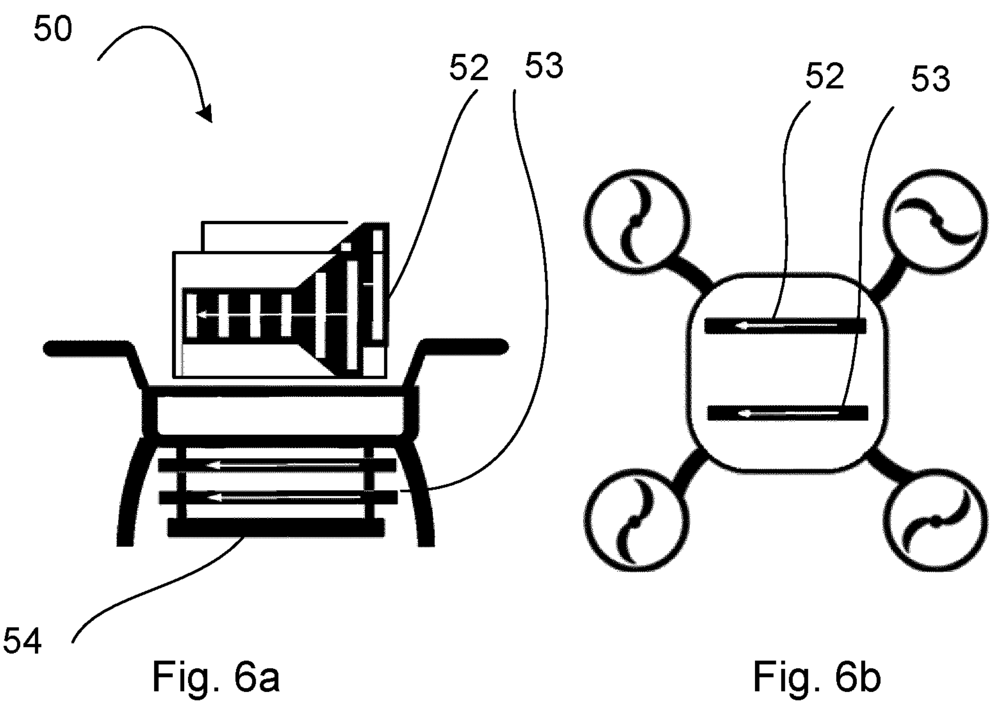
Fig. 6a
Fig. 6b
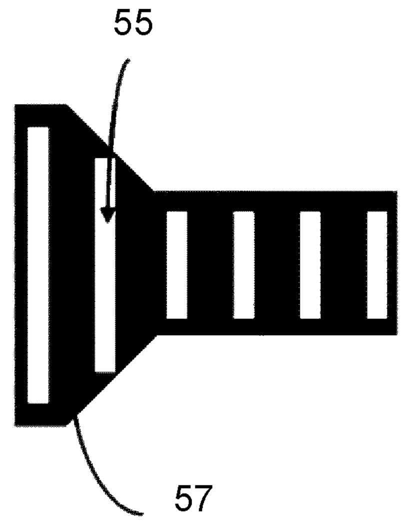
Fig. 7

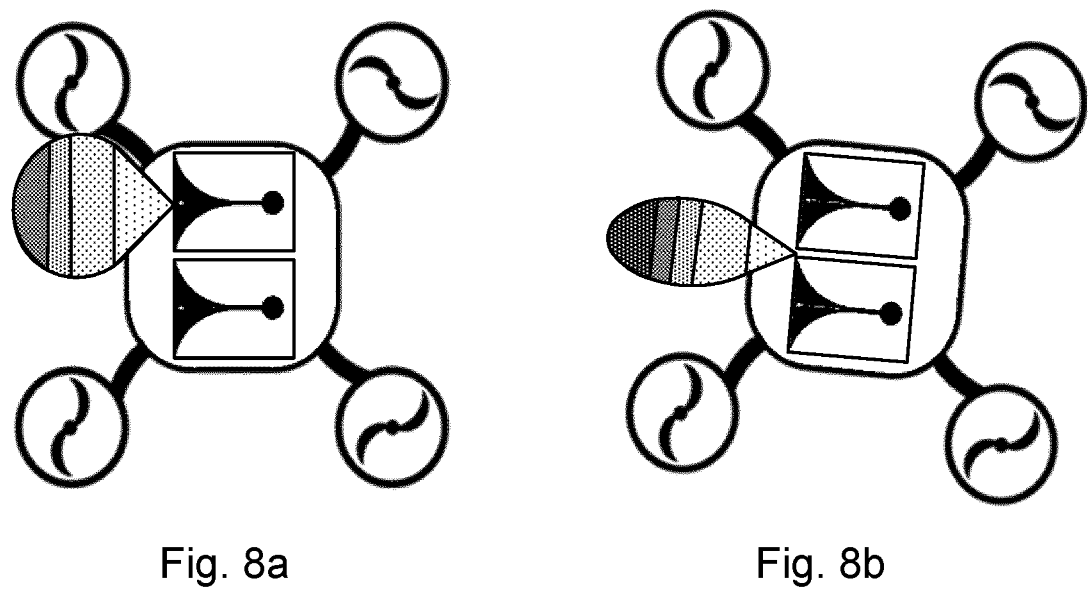
Fig. 8a
Fig. 8b
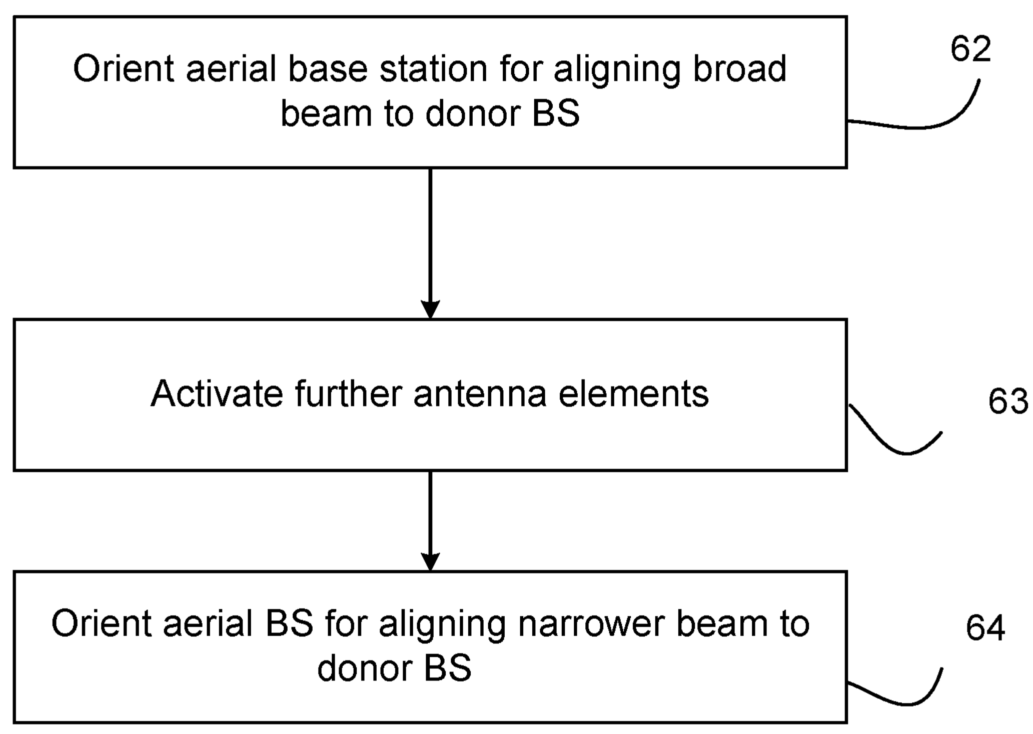
Fig. 9

METHOD AND DEVICES FOR PROVIDING BACKHAUL LINKS

CROSS REFERENCE TO RELATED APPLICATIONS

This application is a 35 U.S.C. § 371 National Stage of International Patent Application No. PCT/EP2021/074600, filed 2021 Sep. 7, which are incorporated by this reference.

TECHNICAL FIELD

The technology disclosed herein relates generally to the field of deployable base stations, and in particular to aerial base stations with backhaul links to ground-based donor base stations.

BACKGROUND

An unmanned aerial vehicle (UAV) base station (BS), also denoted aerial BS or drone BS, can be readily and easily deployed in areas with no or poor network coverage to either introduce network coverage or to enhance an existing coverage. The aerial base stations allow, for instance, public safety personnel to introduce or enhance network coverage in remote areas, such as remotely located forests.

The communications capability of the aerial BS can be broadly divided into wireless access and backhaul connectivity. The communication between the aerial BS and the users on the ground is referred to as wireless access and the communications between the aerial BS and a donor BS that provides an interface to the existing network is referred to as backhaul.

The aerial BS can be designed to operate with or without the availability of a backhaul link. In the absence of a backhaul link, the aerial BS can be designed to operate in an isolated operations mode and host the necessary functionalities to support a few services/applications, such as mission-critical push-to-talk (MCPTT). However, the communication capability is then restricted among the users being served by the aerial BS. An aerial BS with backhaul connectivity to a donor BS allows the users served by the aerial BS to communicate with the network users and utilize the services offered by an established cellular network. However, the aerial BS with backhaul connectivity requires an antenna system that supports backhaul connectivity in addition to the wireless access.

Aerial base stations vary in their size, carrying capacity, the height from which they serve the users, etc. Antenna system design for an aerial BS is greatly influenced by these factors. Aerial BSs flying at higher altitudes and having larger carrying capacity offer the highest flexibility in designing the antenna systems due to smaller number of constraints with respect to size and volume. In contrast, antenna design for smaller and lighter drones is challenging due to strict constraints on size and carrying capacity.

Portable drones which are small and light are expected to play a crucial role in public safety communications, since they can be readily deployed on demand. The aerial BS with backhaul connectivity allows the monitoring and managing of, for instance, a public safety operation from a control center in contrast to isolated operations. The antenna gains in the backhaul link determine how far the aerial BS can be from the donor BS in order to support the required services and throughput. In public safety communications, mission critical video may have to be transmitted to a control center which then requires a backhaul with high throughout.

Irrespective of the size of the aerial BS, it is important to have a good backhaul antenna system for the aerial BS and beneficial to keep the size and weight at a minimum while also minimizing any potential interference caused by the aerial BS to the existing network. For smaller drone BSs, the size may be limiting for the antenna size, as it needs to fit on the drone and such that its antenna gain can enable good backhaul link connectivity in terms of, e.g., link or hop distance and throughput capacity.

SUMMARY

An objective of embodiments in this disclosure is to solve or at least alleviate at least one of the above-mentioned problems. A particular objective is to enable a high throughput capacity of a backhaul link between an aerial BS and a donor BS, while still keeping down the size of the aerial BS, as well as the size of the antenna system. Another particular objective is to limit potential interference from the aerial BS to any existing network.

These objectives, and others, are according to an aspect achieved by an aerial base station comprising a directive backhaul antenna for obtaining a backhaul link to a ground-based donor base station. The directive backhaul antenna is arranged on a body of the aerial base station such that a direction of a main beam of the directive backhaul antenna towards the donor base station is essentially parallel to an axis of the largest dimension of the directive backhaul antenna. Further, the directive backhaul antenna is mounted such that the axis of the largest dimension is parallel to the body of the aerial base station.

The aerial base station comprising such directive backhaul antenna provides a number of advantages. For instance, the aerial base station can move and rotate and therefore a beamsteering functionality is not required in the antenna system, whereby a small and light drone may be used. This in turn gives a more cost-efficient aerial base station. Further, the stability of the aerial base station can still be ensured when mounting the antennas on top or bottom of the aerial base station instead of on a side as in conventional aerial base stations.

A further advantage of the use of directive antennas is that an improved backhaul link budget is obtained. The aerial base station can have a reduced transmit power and still maintain a good backhaul link, and by such reduction of the power consumption, the flying time may be increased for cases wherein the power saved by reducing the transmit power is larger than the power consumed by carrying a larger antenna. The corresponding higher signal-to-noise ratio ensures that the link is more robust to fading and blocking, and higher order modulation formats and higher data rates can be supported. Still further, longer backhaul links are enabled, which in turn improves the ability of the aerial base station to provide coverage in areas farther away from the network.

Still a further advantage is that the aerial base station is less susceptible to interference due to the directive pattern used, and that it experiences less interference from nearby drones and also interferes less with backhaul links of such nearby drones. Further, the spectral efficiency can be increased, i.e., several aerial base stations can use the same backhaul frequency in the same area. Further still, a reduced self-interference is obtained between backhaul and access links when the same frequency band is used.

Yet another advantage is that the herein provided design of the aerial base station is highly improved seen from a balanced load and aerodynamic perspective. In particular, such advantages can be achieved by the herein disclosed low-profile end-fire designs mounted on the top/bottom of an aerial base station.

The objectives are according to an aspect achieved by a method performed in an aerial base station that comprises a directive backhaul antenna for providing backhaul connectivity to a ground-based donor base station. The method comprises orienting the aerial base station such as to align a broad beam towards the donor base station, the broad beam provided by the directive backhaul antenna. The method comprises activating further antenna elements of the array to realize a narrower beam and orienting the aerial base station such as to align the narrower beam towards the donor base station to provide the backhaul connectivity.

The objectives are according to an aspect achieved by a computer program for an aerial base station, the computer program comprising computer program code, which, when run on at processing circuitry of the aerial base station causes the aerial base station to perform the method as above.

The objectives are according to an aspect achieved by a computer program product comprising a computer program as above and a computer readable means on which the computer program is stored.

Further features and advantages of the present disclosure will become clear upon reading the following description and the accompanying drawings.

BRIEF DESCRIPTION OF THE DRAWINGS

FIGS. 4*a* and 4*b* illustrate, in different views, an embodiment of a drone BS with an antenna system.

FIGS. 5*a* and 5*b* illustrate, in different views, an embodiment an antenna configuration for a drone BS.

FIGS. 6*a* and 6*b* illustrate, in different views, still another embodiment of an antenna configuration for a drone BS.

FIG. 7 illustrates an example of size reduction of an antenna.

FIG. 8*a* and FIG. 8*b* illustrate a beam alignment procedure when using an array.

FIG. 9 is a diagram of methods according to various embodiments.

DETAILED DESCRIPTION

Figures 1, 2, 3A, 3B, 3C:
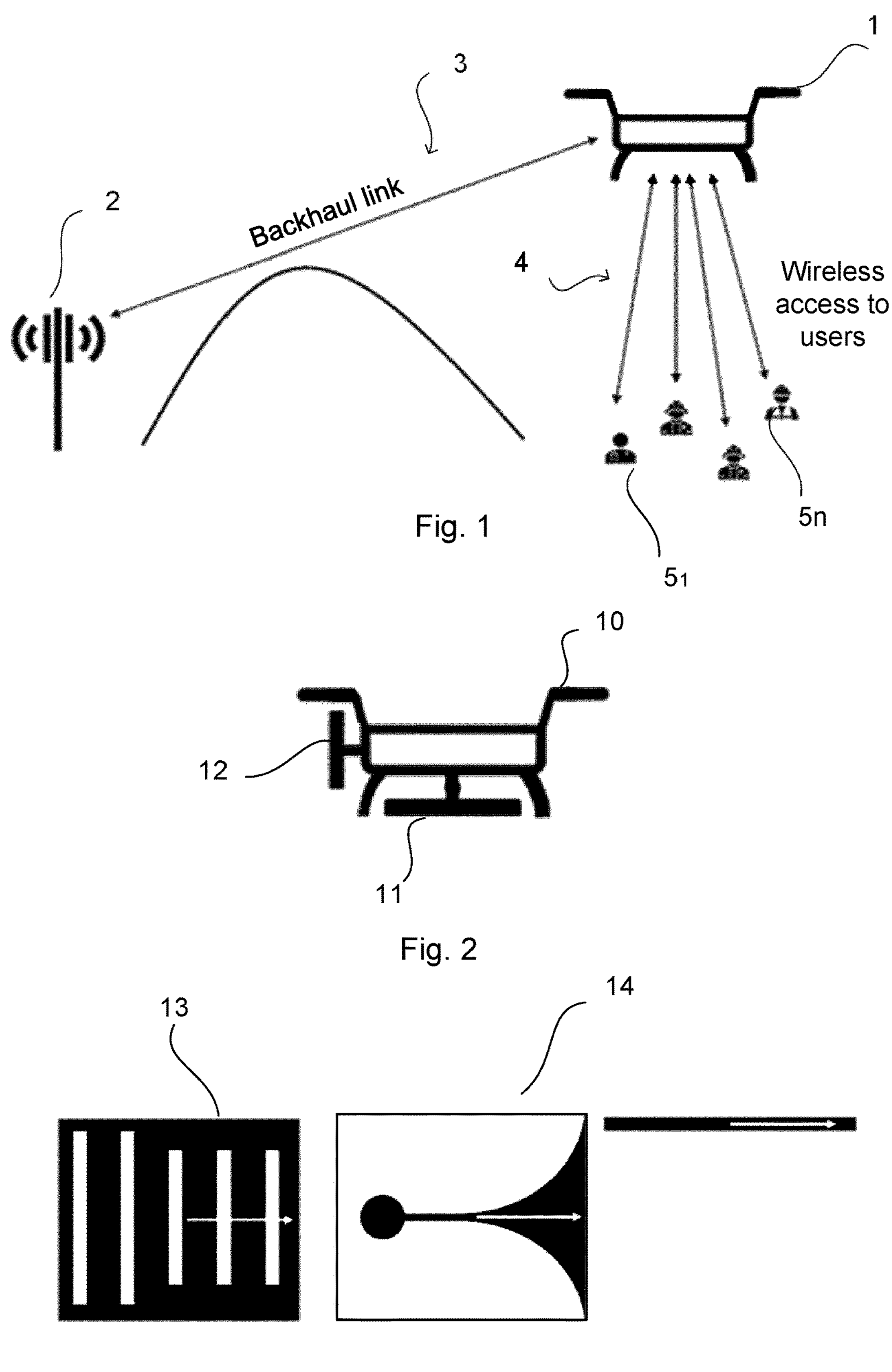
FIG. 1 illustrates backhaul and wireless access links of a drone BS.
FIG. 2 illustrates a drone BS according to prior art.
FIGS. 3*a*, 3*b* and 3*c* illustrate specific examples of backhaul antennas according to various embodiments.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

FIG. 1 illustrates backhaul and wireless access links that are to be provided by means of a drone 1. The drone 1 is denoted drone BS, when having a backhaul antenna and wireless access antenna mounted thereto. A communications network may comprise any number of BSs, although only one BS 2 is shown in the FIG. 1. As may be the case a number of users 51, . . . , 5*n* are out of the coverage area for the communications network, e.g. due to a mountain that blocks signaling as in the illustrated case. The drone 1 is placed (e.g. steered by means of a remote control, or pre-programmed to fly to a certain location) to provide wireless access to the communications network for the users 51, . . . , 5*n*, over wireless access links 4. To achieve this, the donor BS 2 provides backhaul connectivity to the drone 1, which in turn (when having antennas mounted thereto) provides the wireless access links to the users 51, . . . , 5*n*. As described in the background section, the backhaul is achieved by a backhaul link 3 between the donor BS 2 and a drone BS.

In order to provide wide-area coverage, low frequency bands (sub-GHz frequencies) are typically allocated as dedicated or prioritized spectrum for public safety communications worldwide. For example, Band 14, with dedicated frequencies between 700 MHz and 800 MHz has been allocated for public safety communications in several countries.

Typically, the directivity of an antenna system is directly proportional to the aperture of the system and inversely proportional to the square of the wavelength, as given in the formula below:

$$D = \frac{4\pi}{\lambda^2} A_e$$

wherein $A_e$ is the effective aperture of the antenna, $\lambda$ the wavelength, and D the antenna directivity. It can be seen that at sub-GHz frequencies (with wavelength at 750 MHz approximately equal to 40 cm) it is a challenge to realize an antenna with high, or even moderate, directive gain in a compact form factor.

In case of Band 14, an antenna system with 100% radiation efficiency with moderately high directivity (10 dB) would require an aperture of $0.127\ m^2=(0.35\ cm)^2$, which is not feasible nor desirable to mount on the side of a light drone BS.

Since the width of the main lobe is inversely proportional to the directivity of the antenna, the 3 dB beamwidth of a low directivity antenna can be large and the backhaul link can cause interference at other backhaul links or be more susceptible to disturbance from other backhaul links.

Briefly, the above-mentioned difficulties with loss of directionality at low frequencies are overcome according to various embodiments, while still keeping the size and weight of the drone 1 down. A directional antenna is mounted on the drone 1 in order to provide backhaul connectivity with the donor BS 2. In some embodiments, the directional antenna may be used in combination with a method (also provided in various embodiments) that aligns the main beam of the directional antenna system towards the donor BS 2.

Next, various embodiments are described for realization of the directive backhaul antennas on a small-sized, lightweight drone.

FIG. 2 illustrates a drone BS 10 according to prior art, wherein the drone BS 10 is equipped with separate antennas 11, 12 for backhaul and for wireless access to users. These known, traditional antenna systems used for base stations are designed such that the main beam is orthogonal to the plane of the aperture. To match this, the antennas are suitable placed either to the side of the drone, or the bottom of the drone. The antenna system comprises a backhaul antenna 12 and an access antenna 11. This antenna system 11, 12 is mounted on a drone, hence being a drone BS 10 as shown in FIG. 2. Specifically, the access antenna 11 is placed at the bottom of the drone BS 10 in order to provide access connection(s) to the users 51, . . . , 5*n* on the ground, and the backhaul antenna 12 is placed at a side of the drone BS 10 in order to provide backhaul connection to the donor BS 2 situated on the ground. The antenna height of a donor BS 2 is typically larger than the antenna height of BSs dedicated for ground users, e.g., in view of surrounding obstacles.

FIGS. 3*a*, 3*b* and 3*c* illustrate specific examples of backhaul antennas according to various embodiments according to the present teachings. In particular, low-profile end-fire antenna designs using Yagi-uda and Vivaldi antennas, respectively, on Printed Circuit Board (PCB) designs are shown as examples. Still further examples of antennas comprise logperiodic antennas, any end-fire antenna in planar waveguide technology and planar horn antennas realized in planar waveguide technology, such as, e.g., Substrate Integrated Waveguide (this last example is applicable for higher frequencies).

In an embodiment, an antenna array is mounted on an upper side of the drone BS 1 to realize steerable beams for the backhaul link. The beams should in particular be steerable in elevation as the drone can rotate around its axis in order to orient itself towards the donor BS 2. The antenna arrays suggested for use in the various embodiments are mainly low-profile end-fire antennas, in contrast to the commonly used broad-fire antenna and antenna arrays where the main beam is perpendicular to the plane of maximum aperture.

FIG. 3*a* illustrates a first example of such low-profile end-fire antenna design, in the form of Yagi-uda antenna 13 on a PCB. In the Yagi-uda antenna 13, the direction of the main beam is along the axis of the antenna 13, as illustrated by the horizontal arrow (pointing to the right).

FIG. 3*b* illustrates a second example of such low-profile end-fire antenna design, in the form of Vivaldi antenna 14 on a PCB. As for the Yagi-uda antenna 13, the direction of the main beam is along the axis of the antenna 13 also for the Vivaldi antenna 14. This direction is again illustrated by the horizontal arrow.

FIG. 3*c* illustrates a side view of the Yagi-uda and Vivaldi antennas 13, 14 with the arrow showing the direction of the main beam.

At lower frequencies (<1 GHZ), large arrays on the side, as illustrated in the prior art system shown in FIG. 2, may not be feasible. They are cumbersome, create unbalanced load and are not desirable from an aerodynamics perspective. Furthermore, only low antenna gain values can be achieved with such planar arrays mounted to the side as in prior art, since the limited volume available on the side for the backhaul antenna puts a hard limit on the antenna aperture that can be used. The antenna designs that have been described with reference to FIGS. 3*a*-3*c* overcome these issues, in particular by means of the placement of the backhaul antennas according the present teachings.

FIGS. 4*a* and 4*b* illustrate, in different views, an embodiment of a drone BS with an antenna system. FIG. 4*a* illustrates the drone BS 30 in a top view, while FIG. 4*b* illustrates the drone BS 30 in a side view. A wireless access antenna 34 is mounted at the outer bottom side of the drone BS 30, wherein the drone preferably is a lightweight drone. A backhaul antenna 32 comprising a low-profile end-fire antenna in the form of a Vivaldi antenna is mounted on top of the drone BS 30 such that the plane of maximum aperture of the backhaul antenna 32 is parallel to the ground and the main beam points outwards from a side of the drone. It is noted that in other embodiments, the backhaul antenna 32 may be mounted on the bottom of the drone BS 30. This drone BS 30 comprising the Vivaldi backhaul antenna 32 enables a high directivity for the backhaul link.

In an embodiment, the backhaul antenna 32 is mechanically steered, as shown in FIG. 4*b*, in order to change the elevation of the main beam. To implement this, a simple light weight mechanism can be employed in order to mechanically steer the main beam in elevation. There are various such mechanisms, and only one particular example is given here in the form of a linear actuator and illustrated schematically in FIG. 4*b*. A rack and pinion arrangement may be used to elevating or lowering one end of the low weight antenna array, while the other end thereof is mounted by means of a hinge.

In an embodiment, an array of low-profile end-fire antennas is mounted on top or bottom of a drone.

FIG. 5*a* and FIG. 5*b* show, in a top view and side view respectively, an example of such antenna configuration. The array of low-profile end-fire antennas 42 is mounted on the drone BS 30. The antennas 42 may be stacked beside each other to form a 2D array. The array of co-planar antennas is mounted on top of the drone BS 30. Such embodiments achieve steerable narrower beams.

FIGS. 6*a*, 6*b* illustrate, in a side view, and top view respectively, a drone BS 50 according to the present teachings. In an embodiment, an antenna system 52, 53, 54 for the drone BS 50 comprises a backhaul antenna 52, 53 and an access antenna 54. This antenna system 52, 53, 54 is mounted on a drone, hence being a drone BS 50 as shown in 6*a*, 6*b*. Specifically, in the illustrated embodiment, the access antenna 54 is placed at the bottom of the drone BS 50 in order to provide access connection(s) to the users $\mathbf{5}_1, \ldots, \mathbf{5}_n$ on the ground. The access antenna 54 is, in the illustrated embodiment, placed furthest away from the bottom side body of the drone, i.e., farthest out. The backhaul antenna 52, 53 comprises antennas 52 placed at an upper side of the drone BS 50 and also, as illustrated, antennas 53 placed at the bottom side of the drone BS 50, closest to the body of the drone. The backhaul antenna 52, 53 provides the backhaul connection to the donor BS 2 situated on the ground. The antenna height of a donor BS 2 is typically larger than the antenna height of BSs dedicated for ground users, e.g., in view of surrounding obstacles.

When the backhaul antenna 52, 53 is an array of antennas having multiple elements along its vertical axis, beamforming can be used to steer the beam in elevation. This is useful in achieving higher gains when the donor BS 2 and the drone BS 50 are at different heights.

Still with reference to FIGS. 6*a* and 6*b*, an array of low-profile end-fire antennas 52 is shown comprising elements stacked vertically and arranged on the upper side and lower side of the drone BS 50 as described above. Further, an array of low-profile end-fire antennas 53 comprising elements stacked horizontally are mounted on the bottom side of the drone on the drone BS 50 in order to realize dual-polarizations implementing the backhaul antenna system 52, 53.

It is realized, e.g., from the FIGS. 5*a*, 5*b*, 6*a* and 6*b*, that a number of different antenna configurations can be obtained, also other than the particular examples given in relation to these figures.

FIG. 7 illustrates an example of size reduction of an antenna. Size and weight of an antenna should be reduced in order to minimize the adverse impact the antenna system has on the drone BS's performance. In some embodiments, the end-fire antennas described herein may be miniaturized by using high directivity materials (e.g., ceramics) as antenna substrate or by embedding the antenna into high-permittivity materials 57. Using a high-permittivity material near the conductors reduces the size. The desired weight reduction may still further be achieved by using light weight conductors 55, or by using light weight substrate materials (such as polymer foils) or by removing excess substrate material from the antenna as indicated in FIG. 7. This reduces the size of the antenna. It is noted that one or more of the mentioned weight reducing measures may be used in any combination.

In the following, various embodiments are described for achieving alignment of main beam of the directive backhaul antenna.

FIGS. 8*a* and 8*b* illustrate steps of a beam alignment procedure when using an array. The described drone BS 30, 40, 50 equipped with a directive antenna, is oriented such as to align its main beam towards the donor BS 2. In a first step towards fine tuning a backhaul link to the donor BS 2, the drone BS 30, 40, 50 first makes a coarse beam alignment towards the donor BS 2. In the coarse beam alignment, shown in FIG. 8*a*, a subset of elements of an array of a co-planar antenna (e.g., a single element of the antenna array) may be switched on. After the coarse alignment, more elements of the array (e.g., all elements or most of the elements) are switched on to perform a fine alignment of the narrow beam towards the donor BS 2, as shown in FIG. 8*b*.

In an embodiment, the drone BS 30, 40, 50 equipped with a directive antenna is oriented to align the main beam towards the donor BS 2.

In an embodiment, all the elements of the array are activated to create a narrow beam with higher directional antenna gain. To enable beam sweeping, the drone BS moves to a set of pre-defined positions and/or orientations or it rotates based on a set of pre-configured rotation angles in the azimuth plane. The beam (i.e., drone position/rotation) that gives the best channel quality towards the donor BS is selected for setting up the backhaul link connectivity.

In another embodiment, only a subset of the antenna elements in the antenna array are activated to realize a broad beam (broader than the narrowest beam realizable with the array). This may, for instance, be done in case the stability of the drone BS cannot be maintained, e.g., in high wind scenarios, to maintain a robust alignment of the beam towards the donor BS.

The presented embodiments are not limited to lower frequencies, but generalizes well for all frequency bands, including, e.g., band 14 (700 MHZ) which is allotted for public safety use in, e.g., USA. This is enabled by the antenna designs provided herein, wherein the main axis along the largest dimension of the antennas is parallel to the body of the drone. The teachings herein provide exemplary antenna designs and methods implemented for the drone in order to enable maximal directivity while still meeting the restrictions on size, weight etc. that are posed on use of drones. Further, the drone BSs disclosed herein have no limitations on operation distances.

Further, the teachings are not limited to continuously knowing parameters on both sides of the backhaul link in order to determine the final elevation and bearing angles. In such case, communication must be established between the drone and a Global Navigation Satellite System (GNSS) during initial synchronization. In contrast, the herein presented beam steering algorithm provided in conjunction with one of the several antenna designs is generic and does not require information regarding, for instance, base station coordinates.

In contrast to known drone BSs, wherein the directivity of the antenna is fixed, the present teachings suggest the use of a subset of antenna elements in an array to achieve a broader beam. The ability to switch to a broader beam allows the establishing of robust connectivity when the drone cannot be kept stable due to weather condition. This is not possible with the known single antenna with high directivity. In the herein provided design the direction of the beams is always fixed, and the rotation capability of the drones is exploited in order to make the best use of the available area on a drone and to achieve beam alignment in the azimuth direction.

FIG. 9 is a flow chart over steps of an embodiment of a method 60 for providing a backhaul connection between a donor base station 2 and an aerial base station 30, 40, 50 according to various embodiments. The embodiments of the method 60 may be performed by a controller 100, a computer program product comprising code, for example in the form of a computer program, that when run on the controller 100, causes the controller 100 to perform the method. The controller 100 may, for instance, be arranged in the aerial BS 30, 40, 50. The various embodiments of the method 60 may be provided as computer programs 320.

A method 60 is provided that is to be performed in an aerial base station 30, 40, 50. The aerial base station 30, 40, 50 comprises a directive backhaul antenna, 32, 42, 52 for providing backhaul connectivity to a ground-based donor base station 2. The method 60 comprises orienting 62 the aerial base station 30, 40, 50 such as to align a broad beam towards the donor base station 2. The broad beam is provided by the directive backhaul antenna 32, 42, 52.

The method 60 comprises activating 63 further antenna elements of the array to realize a narrower beam.

The method 60 comprises orienting 64 the aerial base station 30, 40, 50 such as to align the narrower beam towards the donor base station 2 to provide the backhaul connectivity.

The method 60 comprises a number of advantages, as has been described. For instance, by orienting the aerial base station such as to align a broad beam towards the donor base station, a beamsteering functionality is not a requirement of the antenna system. This in turn enables a small and light drone to be used, giving a more cost-efficient aerial base station. A reliable backhaul connectivity is provided by activating further antenna elements and orienting the aerial base station towards the donor base station. Meanwhile, the stability of the aerial base station can still be ensured by mounting the antennas on top or bottom of the aerial base station instead of on a side as in conventional aerial base stations.

Further advantages of the use of directive antennas comprise: an improved backhaul link budget, a reduced transmit power while still maintaining a good backhaul link. The corresponding higher signal-to-noise ratio ensures that the link is highly robust to fading and blocking, and higher order modulation formats and higher data rates can be supported. Also longer backhaul links are enabled, which in turn improves the ability of the aerial base station to provide coverage in areas farther away from the network. The weight of the drone may, for instance, be reduced by proper selection of a miniaturized antennas and/or selection of material and/or by using light weight conductors, as has been described earlier.

Further, the aerial base station is less susceptible to interference due to the directive pattern used, picks up less interference from nearby drones and also interferes less with backhaul links of such nearby drones. Further, the spectral efficiency can be increased, i.e., several aerial base stations can use the same backhaul frequency in the same area. Further still, a reduced self-interference is obtained between backhaul and access links when the same frequency band is used.

Yet another advantage is that the herein provided design of the aerial base station is highly improved seen from a balanced load and aerodynamic perspective. In particular, such advantages can be achieved by the herein disclosed low-profile end-fire designs mounted on the top/bottom of an aerial base station.

In an embodiment, the method 60 comprises activating at least a subset of antenna elements of an array of the backhaul antenna 32, 42, 52, 53 to provide the broad beam.

In a variation of the above embodiment, the method 60 comprises activating all antenna elements of the array to create the narrower beam having increased directional antenna gain.

In various embodiments, the method 60 comprises steering the aerial base station 30, 40, 50 to a set of pre-defined orientations for enabling beam alignment using an array with fixed beam direction.

In various embodiments, the method 60 comprises rotating the aerial base station 30, 40, 50 based on a set of pre-configured rotation angles in an azimuth plane for enabling beam alignment.

In various embodiments, the method 60 comprises activating a subset of antenna elements and orientating the aerial base station 30, 40, 50 towards the donor base station 2.

In variations of the above embodiments, the method 60 comprises repeating the activating of subsets of antenna elements until a desired channel quality is obtained to the donor base station 2 and setting up the backhaul connectivity using a selected beam giving the desired quality.

In various embodiments, the method 60 comprises detecting a lack of stability of the aerial base station 30, 40, 50 and activating only a subset of the antenna elements for providing a broad beam to maintain a robust alignment of the beam towards the donor base station 2. A particular example of when the aerial base station may experience lack of stability is in case of strong winds.

An aerial base station 30, 40, 50 is also provided, as has been described. The aerial base station 30, 40 50 comprises a directive backhaul antenna 32, 42, 52 for obtaining a backhaul link to a ground-based donor base station 2. The directive backhaul antenna 32, 42, 52 is arranged on a body of the aerial base station 30, 40, 50 such that a direction of a main beam of the directive backhaul antenna 32, 42, 52 towards the donor base station 2 is essentially parallel to an axis of the largest dimension of the directive backhaul antenna 32, 42, 52. The directive backhaul antenna 32, 42, 52 is mounted such that the axis of the largest dimension is parallel to the body of the aerial base station 30, 40, 50. The mounting may be such that the antenna 32, 42, 52 is integrated with the aerial vehicle (drone) or such that it is arranged on a surface thereof. In some embodiments, the directive backhaul antenna 32, 42, 52 is mounted such as to also be parallel to the ground.

In an embodiment, the directive backhaul antenna 32, 42, 52 is arranged on an upper side of the aerial base station 30, 40, 50.

In other embodiments, the directive backhaul antenna 32, 42, 52 is arranged on a lower side of the body of the aerial base station 30, 40, 50 or on a vertical side thereof.

In some embodiments, the directive backhaul antenna 32, 42, 52 comprises at least one array of antenna elements.

In a variation of the above set of embodiments, the aerial base station 30, 40, 50 comprises two or more arrays of antenna elements stacked horizontally or vertically.

In some embodiments, the aerial base station 30, 40, 50 comprises an access antenna 34, 44, 54 for providing wireless access to at least one user $\mathbf{5}_1, \ldots, \mathbf{5}_n$.

In some embodiments, the aerial base station 30, 40, 50 comprises means for mechanically steering the directive backhaul antenna 32, 42, 52 for changing elevation of the main beam.

In some embodiments, the aerial base station 30, 40, 50 is configured to activate a subset of antenna elements in the directive backhaul antenna 32, 42, 52 to realize a broad beam.

In variations of the above set of embodiments, the aerial base station 30, 40, 50 is configured to be oriented such as to align the broad beam towards a donor base station 2 for a coarse alignment.

In still other variations, the aerial base station 30, 40, 50 is configured to activate more antenna elements in the array of antennas for narrowing the broad beam to a narrower beam.

In variations of the above set of embodiments, the aerial base station 30, 40, 50 is configured to be oriented to align the narrower beam towards the donor base station 2.

Leveraging the mobility and flexibility of a drone, the herein described design allows to use a directive antenna for backhaul on a light and small sized drone BS without adding too much to the weight and size. Further, the teachings herein enable to maintain the stability of the drone since the antennas can be mounted on the top or the bottom of the drone instead of on a side.

Improved backhaul link budget resulting from directive antenna has many benefits:

- The drone can lower the transmit power and still maintain a good backhaul link. Power consumption is reduced, thereby increasing the flying time.
- Higher signal-to-noise ratio means the link is more robust to fading or blocking. Higher order modulation formats and higher data rates can be supported.
- Longer backhaul links are possible, improving the ability of the drone BS to provide coverage to areas farther away from the network.

Figure 10:
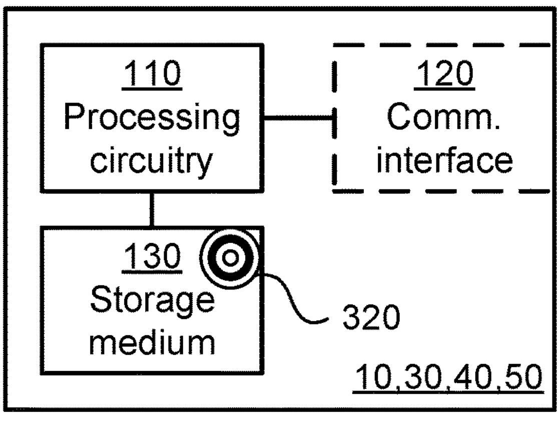
FIG. 10 is a schematic diagram showing functional units of a drone according to embodiments.

The aerial BS 30, 40, 50 is less susceptible to interference owing to the directive pattern, giving yet additional advantages:

- It picks up less interference from nearby drones and interfere less with their backhaul links.
- Spectral efficiency can be increased, i.e. more drones can use the same backhaul frequency in the same area.
- Reduces self-interference between backhaul and access links when using the same band FIG. 10 is a schematic diagram showing functional units of an aerial BS 30, 40, 50 according to embodiments. The functional units 110, 120, 130 may, for instance, be embodied as a controller arranged in the aerial BS 30, 40, 50. That is, each functional unit is part of such controller, which controller in turn is arranged in the aerial BS 30, 40, 50.

Processing circuitry 110 is provided using any combination of one or more of a suitable central processing unit (CPU), multiprocessor, microcontroller, digital signal processor (DSP), etc., capable of executing software instructions stored in a computer program product 130 (as in FIG. 12), e.g. in the form of a storage medium 130. The processing circuitry 110 may further be provided as at least one application specific integrated circuit (ASIC), or field programmable gate array (FPGA).

Particularly, the processing circuitry 110 is configured to cause the controller to perform a set of operations, or steps, as disclosed above. For example, the storage medium 130 may store the set of operations, and the processing circuitry 110 may be configured to retrieve the set of operations from the storage medium 130 to cause the controller to perform the set of operations causing the aerial BS 30, 40, 50 to, for instance, orient itself such as to align a broad beam towards the donor base station 2, the broad beam provided by the directive backhaul antenna 32, 42, 52, 53, to activate further antenna elements of the array to realize a narrower beam, and to orienting itself such as to align the narrower beam towards the donor base station to provide the backhaul connectivity. The set of operations may be provided as a set of executable instructions.

Figure 11:
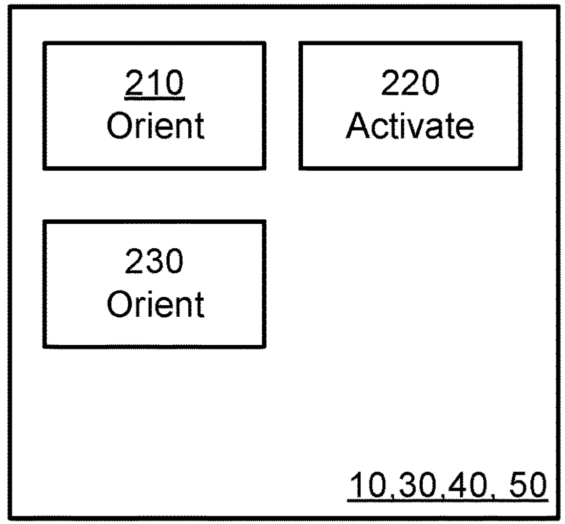
FIG. 11 is a schematic diagram showing functional modules of a drone according to embodiments.

FIG. 11 schematically illustrates, in terms of a number of functional modules, the components of an aerial BS 30, 40, 50 according to an embodiment. The aerial BS 30, 40, 50 of FIG. 11 comprises a number of functional modules; an obtain module 210 configured to perform step 62, an activate module 220 configured to perform step 64, and an orient module 230 configured to perform step 54. The aerial BS 30, 40, 50 of FIG. 11 may further comprise a number of optional functional modules, such as an activate module (not illustrated) configured to activate at least a subset of antenna elements of an array of the backhaul antenna 32, 42, 52, 53 to provide the broad beam. In general terms, each functional module 210, 220, 230 may in one embodiment be implemented only in hardware and in another embodiment with the help of software, i.e., the latter embodiment having computer program instructions stored on the storage medium 130 which when run on the processing circuitry makes the aerial BS 30, 40, 50 perform the corresponding steps mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 210, 220, 230 may be implemented by the processing circuitry 110, possibly in cooperation with the communications interface 120 and/or the storage medium 130. The processing circuitry 110 may thus be configured to from the storage medium 130 fetch instructions as provided by a functional module 210, 220, 230 and to execute these instructions, thereby performing any steps as disclosed herein.

Figure 12:
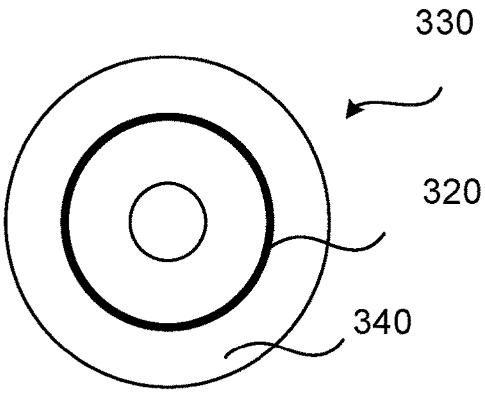
FIG. 12 shown an example of a computer program product comprising computer readable storage medium according to an embodiment.

FIG. 12 shows an example of a computer program product 330 comprising computer readable storage medium according to an embodiment. On this computer readable storage medium 330, a computer program 320 can be stored, which computer program 320 can cause the processing circuitry 110 and thereto operatively coupled entities and devices, such as the communications interface 120 and the storage medium 130, to execute methods according to embodiments described herein. The computer program 320 and/or computer program product 330 may thus provide means for performing any steps as herein disclosed.

In the example of FIG. 12, the computer program product 330 is illustrated as an optical disc, such as a CD (compact disc) or a DVD (digital versatile disc) or a Blu-Ray disc. The computer program product 330 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 330.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method performed in an aerial base station comprising a directive backhaul antenna for providing backhaul connectivity to a ground-based donor base station, the method comprising:

orienting the aerial base station to align a broad beam towards the donor base station, the broad beam provided by the directive backhaul antenna;

activating further antenna elements of the array to realize a narrower beam;

orienting the aerial base station to align the narrower beam towards the donor base station to provide the backhaul connectivity; activating a subset of antenna elements and orienting the aerial base station towards the donor base station; repeating the activating of subsets of antenna elements until a desired channel quality is obtained to the donor base station; and setting up the backhaul connectivity using a selected beam giving the desired quality.

2. The method as claimed in claim 1, comprising activating at least a subset of antenna elements of an array of the backhaul antenna to provide the broad beam.

3. The method as claimed in claim 2, comprising activating all antenna elements of the array to create the narrower beam having increased directional antenna gain.

4. The method as claimed in claim 1, comprising steering the aerial base station to a set of pre-defined orientations for enabling beam alignment using an array with fixed beam direction.

5. The method as claimed in claim 1, comprising rotating the aerial base station based on a set of pre-configured rotation angles in an azimuth plane for enabling beam alignment.

6. The method as claimed in claim 1, comprising detecting a lack of stability of the aerial base station and activating only a subset of the antenna elements for providing a broad beam to maintain a robust alignment of the beam towards the donor base station.

7. An aerial base station comprising a directive backhaul antenna for obtaining a backhaul link to a ground-based donor base station, the directive backhaul antenna being arranged on a body of the aerial base station such that a direction of a main beam of the directive backhaul antenna towards the donor base station is essentially parallel to an axis of a largest dimension of the directive backhaul antenna, the directive backhaul antenna being mounted such that the axis of the largest dimension is parallel to the body of the aerial base station, and comprising processing circuitry configured to cause a controller arranged in the aerial base station to:

orient the aerial base station to align a broad beam towards the donor base station, the broad beam provided by the directive backhaul antenna;

activate further antenna elements of the array to realize a narrower beam;

orient the aerial base station such as to align the narrower beam towards the donor base station to provide the backhaul connectivity;

activate a subset of antenna elements and orient the aerial base station towards the donor base station;

repeat the activating of subsets of antenna elements until a desired channel quality is obtained to the donor base station; and set up the backhaul connectivity using a selected beam giving the desired quality.

8. The aerial base station as claimed in claim 7, wherein the axis of the largest dimension is parallel to the ground.

9. The aerial base station as claimed in claim 7, wherein the directive backhaul antenna is arranged on an upper side of the aerial base station.

10. The aerial base station as claimed in claim 7, wherein the directive backhaul antenna is arranged on a lower side of the body of the aerial base station.

11. The aerial base station as claimed in claim 7, wherein the directive backhaul antenna comprises at least one array of antenna elements.

12. The aerial base station as claimed in claim 11, comprising two or more arrays of antenna elements stacked horizontally or vertically.

13. The aerial base station as claimed in claim 7, comprising an access antenna for providing wireless access to at least one user.

14. The aerial base station as claimed in claim 7, comprising means for mechanically steering the directive backhaul antenna for changing elevation of the main beam.

15. The aerial base station as claimed in claim 7, configured to activate a subset of antenna elements in the directive backhaul antenna to realize a broad beam.

16. The aerial base station as claimed in claim 15, configured to be oriented to align the broad beam towards the donor base station for a coarse alignment.

17. The aerial base station as claimed in claim 16, configured to activate more antenna elements in the array of antennas for narrowing the broad beam to a narrower beam.

18. The aerial base station as claimed in claim 17, configured to be oriented to align the narrower beam towards the donor base station.

19. A non-transitory computer readable storage medium storing a computer program for providing backhaul connectivity to a ground-based donor base station, the computer program comprising computer code which, when run on processing circuitry of an aerial base station, causes an aerial base station to:

orient the aerial base station to align a broad beam towards the donor base station, the broad beam provided by the directive backhaul antenna;

activate further antenna elements of the array to realize a narrower beam;

orient the aerial base station to align the narrower beam towards the donor base station to provide the backhaul connectivity;

activate a subset of antenna elements and orient the aerial base station towards the donor base station;

repeat the activating of subsets of antenna elements until a desired channel quality is obtained to the donor base station; and set up the backhaul connectivity using a selected beam giving the desired quality.

* * * * *